United States Patent [19]

Wise

[11] 3,922,422

[45] Nov. 25, 1975

[54] POLYESTER BONDED TO RUBBER AND METHOD FOR MAKING THE SAME

[75] Inventor: Richard M. Wise, Uniontown, Ohio

[73] Assignee: The General Tire & Rubber Company, Akron, Ohio

[22] Filed: June 14, 1973

[21] Appl. No.: 370,129

[52] U.S. Cl............ 428/246; 57/140 C; 57/153; 156/110 A; 156/315; 156/330; 156/335; 428/250; 428/252; 428/261; 428/272; 428/295; 428/361; 428/378; 428/395; 428/414; 428/480; 260/5; 260/29.2 EP; 260/29.3; 260/831; 427/374; 427/381

[51] Int. Cl.² .................... B29H 9/02; B60C 9/02

[58] Field of Search .......... 161/144, 184, 231, 248, 161/253, 255, 92, 170, 175; 156/110 A, 315, 330, 335; 117/76 T; 57/140 C, 153

[56] References Cited

UNITED STATES PATENTS

| | | | |
|---|---|---|---|
| 2,615,826 | 10/1952 | Mallory et al. | 260/846 |
| 2,902,398 | 9/1959 | Schroeder | 156/110 A |
| 3,231,412 | 1/1966 | Pruitt et al. | 156/110 A |
| 3,308,007 | 3/1967 | Shepard | 156/110 A |
| 3,423,230 | 1/1969 | Georges | 156/110 A |
| 3,431,161 | 3/1969 | Vecellio | 156/110 A |
| 3,660,202 | 5/1972 | Edington et al. | 156/335 |
| 3,775,150 | 11/1973 | McClary | 156/110 A |
| 3,803,035 | 4/1974 | Bhakuni et al. | 156/110 A |

Primary Examiner—George F. Lesmes
Assistant Examiner—Charles E. Lipsey

[57] ABSTRACT

Rubber compounds are readily bonded to polyester reinforcing elements, particularly tire cords of polyester fibers, using a two-step dip process in which the first dip consists essentially of a low molecular weight polyallyl-glycidyl ether in aqueous media and the second dip consists essentially of an alkaline aqueous dispersion of a minor amount by weight of a mixture of a major amount by weight of a rubbery vinyl pyridine copolymer and a minor amount by weight of a heat reactable resinous composition. High H-adhesions are obtained with this process.

14 Claims, No Drawings

POLYESTER BONDED TO RUBBER AND METHOD FOR MAKING THE SAME

OBJECTS

An object of this invention is to provide composite articles containing polyester reinforcing elements, e.g., such as those used in the carcass plies of tires, having a minor amount of a two-dip adhesive so that the adhesive containing elements may subsequently be bonded to rubber on curing and being characterized by exhibiting high cord H-adhesions. A further object is to provide a method for bonding polyester fibers, cords and so forth to rubber compounds using a two-step dipping process and the product of said method. These and other objects and advantages of the present invention will become more apparent to those skilled in the art from the following detailed description and working examples.

SUMMARY OF THE INVENTION

According to the present invention it has been discovered that polyester reinforcing elements can readily be bonded or adhered to curable rubbery compounds by dipping the elements in a first dip consisting essentially of a low molecular weight polyallyl glycidyl ether in aqueous media, drying the same, then dipping the coated elements in a second dip consisting essentially of an aqueous alkaline dispersion of a minor amount by weight of a mixture of a major amount by weight of a rubbery vinyl pyridine copolymer and a minor amount by weight of a heat reactable resinous composition, drying the same, and combining said dipped and dried element with a vulcanizable rubber compound and vulcanizing the same.

Polyester reinforcing elements treated in this fashion exhibit high H-adhesion values. Also, aged polyester reinforcing elements retain a substantial amount of their original H-adhesion values.

DISCUSSION OF DETAILS AND PREFERRED EMBODIMENTS

The polyester reinforcing elements of the present invention comprise fibers, continuous filaments, staple, twisted yarn, tow, yarns, cords, fabric and the like, particularly cords for use in building the carcasses of tires such as automobile and truck tires, and are linear high molecular polyesters usually made by the condensation of α,w-glycols and dicarboxylic acids.

These polyester fibers and the like may be oriented and can have number average molecular weights up to about 60,000 and melting points of up to about 300°C. Preferably these polyesters exhibit substantial crystallinity, up to as much as about 50%, usually 38–45%, high strength and high tenacity. Also, preferred, are the polyesters in which the fiber is composed of at least 80% by weight of an ester of a dihydric alcohol and terephthalic acid such as poly(ethylene terephthalate). Examples of such polyesters are the high molecular weight polymers obtained from polyethylene glycols and the aromatic dicarboxylic acids, e.g., the high molecular weight condensation product obtained from ethylene glycol and terephthalic acid known as polyethylene terephthalate. Other polyesters which may be used are poly(ethylene oxybenzoate); polypivalalactone; terpolymers from dimethyl phthalate, dimethyl isophthalate and ethylene glycol; polyesters having at least two different repeating units from ethylene terephthalate, p-trimethylene oxybenzoate, and ethylene-1,4-diphenoxy butane-4,4'-dicarboxylate; poly(ethylene terephthalate-isophthalate); poly(1,4-cyclohexylenedimethylene terephthalate); and the like and mixtures thereof. Suitable polyester reinforcing elements are commercially available under the trademarks "Dacron" (du Pont), "Encron" (American Enka Corporation) and "Vycron" (Beaunit Corporation). These high molecular weight linear polyesters are well known and can be made by methods known to the art. For example, the preparation of polyesters is shown by U.S. Pat. Nos. 2,465,319; 2,965,613 and 2,901,466. A detailed discussion of polyesters such as polyester cords and fabrics used in the manufacture of tires and other adhesive dips for the same is shown by "Mechanics of Pneumatic Tires," Clark, National Bureau of Standards Monograph 122, U.S. Department of Commerce, issued Nov. 1971, pages 238 to 241 and 279 to 290. Other references disclosing the preparation of polyesters useful for making filaments, fibers, cords and so forth and which can be used to make various products are:

A. "Encyclopedia of Polymer Science and Technology," Volume 11, 1969, Interscience Publishers a division of John Wiley & Sons, Inc., New York, pages 1–41;

B. "Encyclopedia of Chemical Technology," Kirk-Othmer, Second Edition, Volume 16, 1968, Interscience Publishers a division of John Wiley & Sons, Inc., New York, pages 143 to 159; and C. "Polyesters," Korshak et al, 1965, Pergamon Press Inc., New York, N.Y., pages 384 to 415.

The First Dip

The first dip consists essentially of a low molecular weight polyallyl glycidyl ether in aqueous media. The polyallyl glycidyl ether may be dispersed or dissolved in the water. Polyallyl glycidyl ether is soluble in water up to about 8% by weight at 25°C. The polyallyl glycidyl ether may be made by polymerizing allyl glycidyl ether with a peroxide (ditertiary butyl peroxide) catalyst so that it contains a plurality of epoxide groups and has a number average molecular weight of from about 400 to 650 and an average of from about 2 to 6 epoxide groups. See U.S. Pat. No. 2,599,817.

This first dip can contain from about 0.2 to 10% by weight solids of the polyallyl glydicyl ether in the water. The amount of the polyepoxide can be adjusted within these limits to obtain the desired viscosity of the dispersion or solution as well as the amount of polyepoxide to obtain the desired final pickup (after drying) of polyepoxide solids on the polyester cord and of course the desired adhesion. The amount of solids of polyepoxide deposited on the cord can vary from about 0.01 to 1.5% by weight.

The Second Dip

The second dip consists essentially of an aqueous alkaline dispersion of a minor amount by weight of a mixture of a major amount by weight of a rubbery vinyl pyridine copolymer and a minor amount by weight of a heat reactable resinous composition.

The Rubbery Vinyl Pyridine Copolymer

The type of rubber latex used in the polyester tire cord second dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80% by weight of butadiene-1,3, 7 to 32% styrene and 7 to 22% of 2-vinyl pyridine. Excellent results are obtained using a latex of a terpolymer of about 70% by weight of butadiene-1,3, 15% styrene and 15% 2-vinyl pyridine having a total solids content of around 30 to 50% by weight. Also, blends of latices may be used such as blend of a butadiene-1,3/2-vinyl pyridine rubbery copolymer latex and a butadiene 1,3/styrene rubbery copolymer latex or a blend of a butadiene-1,3/styrene/2-vinyl pyridine rubbery copolymer latex and a butadiene-1,3/styrene rubbery copolymer latex so long as the percent by weight ratio of total monomers in the copolymers is within the ranges as specified above. The pH of the latices should be similar and the surfactants and stabilizers should be compatible to avoid coagulation on blending or mixing of the latices. Further disclosures of rubbery vinyl pyridine copolymer latices may be found in U.S. Pat. Nos. 2,615,826 and 3,437,122.

The Heat Reactable Resinous Composition

The heat reactable (or hardenable) resinous composition can be (1) a 2,6-bis(2,4-dihydroxy phenyl methyl)-4-chlorophenol composition, (2) a resorcinol-formaldehyde resole, mixtures of (1) and (2), or (3) a polyepoxide plus an amine curing agent for the epoxide.

1. The heat reactable 2,6-bis(2,4-dihydroxy phenyl methyl)-4-chlorophenol composition used in the dip of the present invention is made by the process of first reacting about 2 mols of formaldehyde with 1 mol of para-chlorophenol to provide 2,6-dimethylol-4-chlorophenol which then is reacted with about 2 mols of resorcinol to give the heat reactable bis(dihydroxy phenylmethyl) chlorophenol composition. The final product may be treated to remove unused starting materials and by-products although this is not usually necessary. However, the product as produced is substantially heat reactable 2,6-bis(2,4-dihydroxy phenylmethyl)-4-chlorophenol composition having an average molecular weight of up to about 800 and a melting point of up to about 240°C. It is preferably used as made without subsequent expensive purification steps. It is added to or mixed with the latex of the rubbery vinyl pyridine copolymer in the form of a solution 5–30% solids in water containing NH$_3$ sufficient to render the solution alkaline, usually about 0.5 to 7.5%. More information on how to prepare the heat reactable 2,6-bis(2,4-dihydroxy phenyl methyl)-4-chlorophenol composition is shown by Mather, "Development of a Polyester-Rubber Adhesive," British Polymer Journal, Volume 3, Mar., 1971, pages 58 to 62 and U.S. Pat. No. 3,660,202. The chlorophenolic composition is heat reactable so that it can react with itself, the rubber and possibly also the cord.

2. The heat reactable resorcinol-formaldehyde resole is made by reacting an excess of formaldehyde (or formaldehyde donor) with resorcinol or similar phenolic compound in aqueous media using sodium hydroxide as a catalyst to form water soluble resoles containing hydroxyl and methylol groups. Such resoles are well known and cure by the application of heat. See "The Chemistry of Phenolic Resins," Martin, John Wiley & Sons, Inc., New York, 1956.

When using mixtures of (1) and (2), the resorcinol-formaldehyde resole is used in a ratio (figured as dry weight) of from about 0.1 to 1.5 part by weight per part by weight of the chlorophenolic composition.

3. The epoxide used in the second polyester tire cord dip can be an aqueous solution or dispersion of from about 0.2 to 10% by weight solids of an epoxide having an average of from about 2 to 6 epoxide groups per molecule. The amount of the polyepoxide can be adjusted within these limits to obtain the desired viscosity of the dispersion or solution as well as the amount of polyepoxide to obtain the desired final pickup (after drying) of polyepoxide solids on the polyester cord and of course the desired adhesion. The amount of solids of polyepoxide deposited on the cord can vary from about 0.01 to 2.5% by weight. Examples of suitable epoxides are triglycidyl isocyanurate; 1-epoxyethyl-3,4-epoxycyclohexane; vinyl cyclohexene dioxide; ethylene glycol diglycidic ether; 1,2-propanediol diglycidic ether; 1,3-propanedioldiglycidic ether; 1,3-butanedioldiglycidic ether; 1,4-butanediol diglycidic ether; 2,3-butanediol-diglycidic ether; and the glydicyl ethers of glycerol, erythritol, pentaerythritol, and sorbitol which contain two to six glycidic groups per molecule, for example, the diglycidyl ether of glycerol, the triglycidyl ether of hexanetriol and so forth. Still other polyepoxides can be used such as 3,4-epoxycyclohexyl methyl-3,4-epoxy cyclohexane carboxylate; 3-(3,4-epoxycyclohexane)-8,9-epoxy-2,4-dioxaspiro[5.5]-undecane; bis(2,3-epoxycyclopentyl)ether; bis(3,4-epoxy-6-methylcyclohexyl methyl) adipate; the diglycidyl ether of polyethylene glycol 400, polyallyl glycidyl ether, the diglycidyl ether of bisphenol A, epoxy resorcinol ethers, and the like. Mixtures of these polyepoxides can be used. These polyepoxides have a molecular weight of up to about 650. Preferred are the water soluble polyglycidyl ethers including the polyhydroxylated saturated aliphatic hydrocarbons of from 2 to 10 carbon atoms, especially from those hydrocarbons having from 2 to 3 hydroxyl groups. Emulsifying agents, especially non ionic emulsifying agents, can be of help in making aqueous dispersions. It is much preferred to use aqueous solutions of the epoxides.

Amine crosslinking agents or hardeners are used with the epoxides in the second dip to cure the epoxides. They are generally used in stoichiometric ratios. The amines should be water dispersible or water soluble and should not volatilize nor substantially volatilize during subsequent drying of the dipped polyester cord. Examples of suitable amines are tetraethylenepentamine, diethylene triamine, diethylaminopropylamine, triethylenetetramine, and the like and mixtures thereof. The epoxides and the amines used for curing them are well known and can be made by methods shown in the prior art:

a. "Encyclopedia of Chemical Technology," 2nd Ed., Kirk-Othmer, Volume 8, Interscience Publishers a division of John Wiley & Sons, Inc., New York, 1965, pages 238 to 312;

b. "Encyclopedia of Polymer Science and Technology," First Edition, Volume 6, Interscience Publishers a division of John Wiley & Sons, Inc., New York, 1967, pages 83 to 102, 106, 108, 146 to 148, 168 to 170 and 209 to 222;

c. "Cyclic Monomers," Frisch, Wiley-Interscience a division of John Wiley & Sons, Inc., New York, 1972, pages 1 to 54;

d. "Polyesters," Part I Polyalkylene Oxides and Other Polyethers, Gaylord, InterScience Publishers a division of John Wiley & Sons, Inc., New York, 1963, pages 83 to 102; and e. "Epoxy Resins," Lee and Neville, McGraw-Hill Book Company, Inc., New York, 1957.

Water is used in an amount sufficient to provide for the desired dispersion of the rubber or latex particles, for the solution of the heat reactable resinous composition and for the proper solids content to get the necessary pick-up of solids on and penetration between the fibers of the polyester cord.

The second dip thus consists essentially of an aqueous dispersion of the rubbery vinyl pyridine copolymer latex and the heat reactable resinous composition, the copolymer and heat reactable composition being present in a total amount (as dry solids, dispersed or dissolved in the water) of from about 10 to 30% by weight. The ratio (dry) of the copolymer to the heat reactable resinous composition in the dip is from about 100:10 to 100:75 parts by weight, perferably from about 100:15 to 100:55 parts by weight. Sufficient alkaline material is present from the heat reactable composition to render the dip alkaline or additional alkaline material such as $NH_3$, $NH_4OH$, and/or $NaOH$ can be added to achieve this purpose, to prevent premature coagulation of the rubbery copolymer and to solubilize the heat reactable composition.

To provide data for the tire cord adhesive of this invention, a standard single-cord H-pull test is employed to determine the static adhesion at room temperature and above of the adhesive-coated tire cord to rubber. All the data submitted herein including the examples which follow are based upon identical test conditions, and all test specimens are prepared and tested in the same way generally in accordance with ASTM Designation: D 2138–67.

In order to apply the adhesive dips to the polyester cords in a reliable manner, the cords are fed through the adhesive dip baths, the first dip being the bath containing the polyepoxide and the second dip being the bath containing the rubber and the heat reactable composition, and into a drying oven after each dip where they are dried. After the frist dip, the cords are dried and cooled, dipped in the second dip and again dried and cooled. Also, as the cords leave the ovens they enter cooling zones where they are air cooled. In each case the adhesive-coated cords leaving the dips are dried in ovens at from about 300° to 500°F., or at a temperature below the temperature at which the polyester of the cord would lose its tensile strength, for from about 30–150 seconds to heat set each adhesive on the cord. The time the cord remains in each dip is about a second or so or at least for a period of time sufficient to allow wetting of the cord and penetration of the fibers of the cord by the adhesive dips.

The single-cord H-pull test is then employed to determine the static adhesion of the dried adhesive coated polyester fiber cords to rubber. In each case the rubber test specimens are made from the same standard type rubber composition using the following recipe:

| Material | Parts by Weight |
| --- | --- |
| Natural rubber (No. 3 Smoked Sheet) | 36.50 |
| Butadiene-styrene rubbery copolymer, average 23.5% bound styrene, emulsion polymerized | 43.50 |
| Polybutadiene (solution polymerized BD, about 93% cis-1,4, Raw Mooney ML-4 at 212°F. about 40–50) | 20.0 |
| Carbon black, high abrasion furnace (high structure) | 35.0 |
| Carbon black, fast extrusion furnace | 35.0 |
| Alkyl aromatic polyindene resin, reinforcing and processing aid, Picco 100, Pennsylvania Industrial Chemical Corp. | 4.5 |
| Naphthenic oil, Circosol Type 2XH, Sun Oil Co. | 32.80 |
| Zinc oxide | 3.8 |
| Stearic acid | 1.5 |
| Mixture of mono, di and tristyrenated phenols, Age Rite Spar, R. T. Vanderbilt Co., Inc., antioxidant | 1.2 |
| Benzothiazyl disulfide, Altax, R. T. Vanderbilt Co., Inc., accelerator | 1.2 |
| Tetramethyl thiuram monosulfide, active ingredient, Thionex, accelerator, E. I. du Pont de Nemours & Co., Inc. | 0.1 |
| Crystex, about 80% insoluble sulfur and 20% petroleum oil, Stauffer Chemical Co. | 3.0 |

In every case the polyester cords to be tested are placed in parallel positions in a multiple-strand mold of the type described in the single-cord H-pull adhesion test designated ASTM D-2138-67, the mold is filled with unvulcanized rubber of the above composition, the cords being maintained under a tension of 50 grams each, and the rubber is cured 20 minutes at around 305°F. to the elastic state. Each rubber test specimen is ¼ inch thick and has a ⅜ inch cord embedment.

After the rubber has been cured, the hot reticulate cured rubber piece is removed from the mold, cooled to about room temperature (70°–77°F.), and H-test specimens are cut from said piece, each specimen consisting of a single polyester cord encased in rubber and having each end embedded in the center of a rubber tab or embedment having a length of around 1 inch or so. The specimens are then aged at least 16 hours at room temperature. The force required to separate the cord from the rubber is then determined at room temperature or 250°F. using an INSTRON tester provided with specimen grips. The maximum force in pounds required to separate the cord from the rubber is the H-adhesion value.

While the adhesive containing polyester reinforcing elements of this invention can be adhered to a vulcanizable blend of natural rubber, polybutadiene rubber, and rubbery butadiene-styrene copolymer by curing the same in combination together, it is apparent that said adhesive containing polyester reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed.

Polyester fibers, yarns, filaments, cords or fabric and the like coated with the double dip adhesive of the present invention can have from about 3 to 7% by weight (dry) total solids from the adhesive dips on the cord based on the weight of the cord and can be used in the manufacture of carcasses, belts, flippers and chafers of radial, bias, or belted-bias passenger tires, truck tires, motorcycle and bicycle tires, off-the-road tires, airplane tires, transmission belts, V-belts, conveyor belts, hose, gaskets, rubbers, tarpaulins and the like.

The following examples will serve to illustrate the invention with more particularity to those skilled in the art. In these examples the parts are parts by weight unless otherwise indicated.

EXAMPLE I

Polyester cords ("Dacron," du Pont, type 1300/3) were dipped in the aqueous mixture (Dip A) shown below and then were dried (heat treated) at 440°F./90 seconds with 0% applied stretch. This cord was then dipped in the other aqueous dispersions shown below and dried (heat treated) at 440°F./90 seconds with 0% applied stretch. After cooling, the cords were embedded in a standard rubber stock and molded, and the resulting assembly was cured for 20 minutes at 305°F. After curing, the assembly was removed from the mold and cooled, and the cords were tested according to the standard H-adhesion test. The adhesions are compared with cords which do not contain the primer dip of this invention. The compositions of the cord dips and the test results are shown below:

TABLE I

| First Dip | Second Dip | H-Adhesion, Pounds (⅜" rubber embedment) | | | |
|---|---|---|---|---|---|
| | | At Room Temperature (about 25°C.) | | | At 250°F.[3] |
| | | Unaged | Heat Aged[1] | Steam Aged[2] | Unaged |
| None | B | 43 | 29 | 29 | 27 |
| A | B | 62 | 42 | 51 | 34 |
| None | C | 53 | 38 | 46 | 29 |
| A | C | 62 | 47 | 57 | 37 |

Notes:

Dip A — Aqueous mixture of 198.0 parts of water and 2.0 parts of low molecular weight poly(allyl glycidyl ether) having a $M_n$ 520–610, Epoxy content (equiv/100g) 0.68–0.71, Bromine No. 38–50.2, and acid content <0.001–0.0097. Dip B — Aqueous alkaline dispersion of:

a. 4.5 parts of resorcinol were reacted with 4.0 parts of formaldehyde solution (37% by weight of HCHO in water) in 81.3 parts of water plus 8.8 parts 1N sodium hydroxide;
b. After B.a. was aged 2 hours, there were mixed with B.a. 66.2 parts of a latex of a rubbery terpolymer of 70% by weight butadiene-1,3, 15% by weight of styrene, and 15% by weight of 2-vinyl pyridine (41% by weight solids); and
c. After the B.b. mixture was added for 24 hours, there were mixed with B.b. 32.9 parts of an aqueous solution containing about 5.5% by weight of ammonia and 20% by weight of 2,6-bis(2,4-dihydroxyphenylmethyl)-4-chlorophenol (e.g., the reaction product of HCHO, p-chlorophenol and resorcinol).

Dip C — Aqueous alkaline dispersion of:
a. 67.5 parts of the same type of rubber latex as shown in Dip B;
b. 67.5 parts of water; and
c. 65.0 parts of the same type of aqueous alkaline chlorophenolic solution as shown for Dip B.

1. Sample was heated in a closed container at 300°F. for 24 hours under nitrogen before conducting H-adhesion test.
2. Sample was heated in a closed container with water present at 250°F. for 4 hours under nitrogen before conducting H-adhesion test.
3. Sample was heated in INSTRON oven for 15 minutes at 250°F. before conducting H-adhesion test.

The above tests show the much higher H-adhesion observed for polyester cord both aged and unaged when using the first dip of this invention with two different second dips.

EXAMPLE II

Polyester cords ("Dacron," du Pont, type 1,300/3) were dipped in the aqueous mixture (Dip A) described in Example I and then were dried (heat treated) at 440°F./90 seconds with 0% applied stretch. A similar polyester cord was dipped in the aqueous mixture (Dip D) described below and then dried (heat treated) at 440°F./90 seconds with 0% applied stretch. These cords were then dipped in the second aqueous dips shown below and dried (heat treated) at 440°F./90 seconds with 0% applied stretch. After cooling, the cords were embedded in rubber, cured, and tested as described in Example I. The compositions of the cord dips and the test results are shown below:

TABLE II

| First Dip | Second Dip | H-Adhesion, Pounds (⅜" rubber embedment) at Room Temperature (about 25°C.) | | |
|---|---|---|---|---|
| | | Unaged | Heat Aged[1] | Steam Aged[2] |
| A | E | 44 | 28 | 36 |
| D | E | 34 | 25 | 29 |
| A | F | 57 | 31 | 40 |
| D | F | 56 | 30 | 36 |
| A | B | 62 | 42 | 51 |
| D | B | 48 | 32 | 37 |
| A | C | 62 | 47 | 57 |
| D | C | 53 | 37 | 45 |

Notes:

Dip A — Same as Dip A in Example I
Dip B — Same as Dip B in Example I
Dip C — Same as Dip C in Example I
Dip D — Aqueous mixture of 198.0 parts of water and 2.0 parts of NER-010A from Nagase & Co., Ltd. (Condensation product of epichlorohydrin and glycerol: epoxy equivalent weight = 153, viscosity (cps, 25°C.) = 110, specific gravity (25°C./4°C.) = 1.23).

Dip E — Aqueous alkaline dispersion of:
a. 38.5 parts resorcinol were reacted with 56.7 parts of formaldehyde solution (37% by weight of HCHO in water) in 810.0 parts of $H_2O$ plus 26.2 parts 1N sodium hydroxide;
b. After E.a. was aged 6 hours, 266.0 parts of E were diluted with 60.0 parts of $H_2O$; and
c. To E.b. were added 244.0 parts of the same type of rubber latex shown for Dip B in Example I plus 11.3 parts of 28% ammonium hydroxide. This mixture was aged for 16 hours.

Dip F — Aqueous alkaline dispersion of:
a. 84.9 parts of the same type of rubber latex as shown for Dip B in Example I;

b. 95.1 parts of a mixture of 88.4 parts of water and 6.7 parts of glycerol diglycidyl ether (NER-010A, Nagase & Co., Ltd., condensation product of epichlorohydrin and glycerin); and c. 20 parts of a mixture of 18 parts of water and 2 parts of tetraethylenepentamine.

Aqueous dispersion F was aged overnight.

1. Sample was heated in a closed container at 300°F. for 24 hours under nitrogen before conducting H-adhesion test.

2. Sample was heated in a closed container with water present at 250°F. for 4 hours under nitrogen before conducting H-adhesion test.

The above tests show much higher H-adhesions observed for polyester cord both aged and unaged using several second dips when the first dip of this invention (Dip A) is compared with another epoxide used as a primer dip.

EXAMPLE III

A polyester cord ("Dacron," du Pont, type 1300/3) was dipped in the aqueous Dip A mixture of Example I and then dried (heat treated) at 440°F./90 seconds with 0% applied stretch. This cord along with a similar untreated polyester cord was then dipped in a second aqueous dip shown below and dried (heat treated) at 440°F./90 seconds with 0% applied stretch. After cooling, the cords were embedded in rubber, cured, and tested as described in Example I. The composition of the cord dips and the test results are shown below:

TABLE III

| First Dip | Second Dip | H-Adhesion, Pounds (⅜" rubber embedment) at Room Temperature (about 25°C.) | | |
|---|---|---|---|---|
| | | Unaged | Heat Aged[1] | Steam Aged[2] |
| None | G | 58 | 39 | 37 |
| A | G | 55 | 43 | 55 |

Notes:
Dip A — Same as Dip A in Example I.
Dip G — Aqueous alkaline dispersion of:
a. 54.0 parts of the same type of vinyl pyridine rubber latex shown for Dip B in Example I;
b. 54.0 parts of water;
c. There was mixed with G.a.b. 13.5 parts of a latex (42% solids) of a rubber copolymer of about 52% by weight butadiene-1,3 and 48% by weight of styrene plus 13.5 parts of water; and
d. 65.0 parts of the same type of aqueous alkaline chlorophenolic solution as shown for Dip B in EXAMPLE I.

1. Sample was heated in a closed container at 300°F. for 24 hours under nitrogen before conducting H-adhesion test.

2. Sample was heated in a closed container with water present at 250°F. for 4 hours under nitrogen before conducting H-adhesion test.

Although there is no improvement in the unaged H-adhesion using the first dip of this invention with the second dip in the above Example III, the heat aged adhesion is improved and the steam aged adhesion is very much improved showing no decrease from the unaged adhesion.

From the foregoing examples it is seen that polyester cord processed in a first dip composed of a 1% aqueous mixture of a low molecular weight poly(allyl glycidyl ether) followed by processing in various cover dips shows improved adhesions before aging and also improved retained adhesions after in-rubber aging. Also, the use of the low molecular weight poly(allyl glycidyl ether) first dip shows improvements over other epoxy compounds used as first dips. This retention of adhesion after aging is important since heavy duty tires such as truck tires operate at higher temperatures.

The embodiments of the invention in which an exclusive property or privilege is claimed are defined as follows:

1. A method for adhering a polyester reinforcing element to a rubber compound which comprises dipping said element in a first dip consisting essentially of an aqueous dispersion or suspension of a minor amount by weight of a polyallyl glycidyl-ether having a number average molecular weight of from about 400 to 650 and an average of from about 2 to 6 epoxide groups, drying said dipped element, dipping said dried polyepoxide treated element in a second dip consisting essentially of an aqueous alkaline dispersion of a minor amount by weight of a mixture of a major amount by weight of a rubbery vinyl pyridine copolymer and a minor amount by weight of a heat reactable resinous composition, drying the same, and combining said twice dipped and twice dried element with a vulcanizable rubber compound and vulcanizing the same, said heat reactable resinous composition being selected from the group consisting of 1. a substantially heat-reactable 2,6-bis(2,4-dihydroxyphenylmethyl)-4-chlorophenol composition, 2. a mixture of a heat reactable resorcinol-formaldehyde resole having hydroxyl and methylol groups and a substantially heat reactable 2,6-bis(2,4-dihydroxyphenylmethyl)-4-chlorophenol composition, and 3. a mixture of a water soluble or dispersible epoxide having from 2 to 6 epoxide groups and a molecular weight up to about 650 and an epoxide amine curing agent in an amount sufficent to cure said epoxide.

2. A method for adhering a polyester reinforcing element to a rubber compound which comprises treating said element with a first composition consisting essentially of an aqueous solution or dispersion containing from about 0.2 to 10% by weight as solids of polyallyl glycidyl ether having a number average molecular weight of from about 400 to 650 and an average of from about 2 to 6 epoxide groups, heat treating said element containing said solution to remove the water, to heat set said polyepoxide on said element, and to deposit on said element from about 0.01 to 1.5% by weight of said polyepoxide based on the weight of said element, cooling and treating said heat treated polyepoxide containing element with a second composition consisting essentially of an aqueous alkaline dispersion of from about 10 to 30% by weight (as dry solids) of a rubbery vinyl pyridine copolymer and a heat reactable resinous composition, the parts by weight ratio of said copolymer to said heat reactable resinous composition being from about 100:10 to 100:75, heat treating said element with said second composition to remove the water, to heat-set the solids from said second composition and to deposit on said element from both said first and second compositions a total of from about 3 to 7% by weight (solids), cooling said twice treated element, combining said cooled twice treated element with an unvulcanized vulcanizable rubber compound, and vulcanizing the same, said heat treatments being conducted at temperatures of from about 300° to 500°F. for from about 30 to 150 seconds, said heat reactable resinous composition being selected from the group consisting of 1. a substantially heat-reactable 2,6-bis(2,4-dihydroxyphenylmethyl)-4-chlorophenol composition,
2. a mixture of a heat reactable resorcinol-formaldehyde resole having hydroxyl and methylol groups and a substantially heat reactable 2,6-bis(2,4-dihydroxyphenylmethyl)-4-chlorophenol composition, and
3. a mixture of a water soluble or dispersible epoxide having from 2 to 6 epoxide groups and a molecular weight up to about 650 and an epoxide amine curing agent in an amount sufficient to cure said epoxide.

3. A method according to claim 2 where said rubbery vinyl pyridine copolymer is a copolymer of from about 60 to 80% by weight of butadiene-1,3, from 7 to 32% by weight of styrene, and from 7 to 22% by weight of 2-vinyl pyridine.

4. A method according to claim 3 where said copolymer is a blend of a terpolymer of butadiene-1,3, styrene and 2-vinyl pyridine and a copolymer of butadiene-1,3 and styrene.

5. A method according to claim 3 where said heat reactable resinous composition is a substantially heat reactable 2,6-bis(2,4-dihydroxyphenylmethyl)-4-chlorophenol composition.

6. A method according to claim 3 where said heat reactable resinous composition is a mixture of a heat reactable resorcinol-formaldehyde resole having hydroxyl and methylol groups and a substantially heat reactable 2,6-bis(2,4-dihydroxyphenylmethyl)-4-chlorophenol composition.

7. A method according to claim 3 where said heat reactable resinous composition is a mixture of a water soluble or dispersible epoxide having from 2 to 6 epoxide groups and a molecular weight up to about 650 and an epoxide amine curing agent in an amount sufficient to cure said epoxide.

8. A bonded composite material comprising a polyester reinforcing element embedded in a vulcanized rubber, said element containing a total of from about 3 to 7% by weight (dry) based on the weight of said element of an adhesive composition consisting essentially of a first deposit of heat set polyallyl glycidyl ether having a number average molecular weight of from about 400 to 650 and an average of from about 2 to 6 epoxide groups and a second deposit of a heat set mixture of a major amount of a rubbery vinyl pyridine copolymer and a minor amount of a heat reactable resinous composition, said adhesive composition forming a bond between said element and said rubber, said heat reactable resinous composition being selected from the group consisting of 1. a substantially heat-reactable 2,6-bis(2,4-dihydroxyphenylmethyl)-4-chlorophenol composition,
2. a mixture of a heat reactable resorcinol-formaldehyde resole having hydroxyl and methylol groups and a substantially heat reactable 2,6-bis(2,4-dihydroxyphenylmethyl)-4-chlorophenol composition, and
3. a mixture of a water soluble or dispersible epoxide having from 2 to 6 epoxide groups and a molecular weight up to about 650 and an epoxide amine curing agent in an amount sufficient to cure said epoxide.

9. A bonded composite material according to claim 8 in which said first deposit comprises from about 0.01 to 1.5% by weight of said element.

10. A bonded composite material according to claim 8 where said rubbery vinyl pyridine copolymer is a copolymer of from about 60 to 80% by weight of butadiene-1,3, from 7 to 32% by weight of styrene, and from 7 to 22% by weight of 2-vinyl pyridine and where the parts by weight ratio of said rubbery vinyl pyridine-copolymer to said heat reactable resinous composition is from about 100:10 to 100:75.

11. A bonded composite material according to claim 10 where said copolymer is a blend of a terpolymer of butadiene-1,3, styrene and 2-vinyl pyridine and a copolymer of butadiene-1,3 and styrene.

12. A bonded composite material according to claim 10 where said heat reactable resinous composition is a substantially heat-reactable 2,6-bis(2,4-dihydroxyphenylmethyl)-4-chlorophenol composition.

13. A bonded composite material according to claim 10 where said heat reactable resinous composition is a mixture of a heat reactable resorcinol-formaldehyde resole having hydroxyl and methylol groups and a substantially heat reactable 2,6-bis(2,4-dihydroxyphenylmethyl)-4-chlorophenol composition.

14. A bonded composite material according to claim 10 where said heat reactable resinous composition is a mixture of a water soluble or dispersible epoxide having from 2 to 6 epoxide groups and a molecular weight up to about 650 and an epoxide amine curing agent in an amount sufficient to cure said epoxide.

* * * * *